(12) United States Patent
Robillard et al.

(10) Patent No.: US 8,239,692 B1
(45) Date of Patent: Aug. 7, 2012

(54) AUTOMATIC POWER-ON SYSTEM AND METHOD USING HIGH-SPEED COMMUNICATION LINE

(75) Inventors: Michael N. Robillard, Shrewsbury, MA (US); Jason Pritchard, Hopkinton, MA (US); Himanshu Agrawal, Cambridge, MA (US); Jason B. Stock, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 1242 days.

(21) Appl. No.: 11/731,130

(22) Filed: Mar. 31, 2007

(51) Int. Cl.
*G06F 1/00* (2006.01)
*G06F 9/00* (2006.01)
*G06F 9/24* (2006.01)
*G06F 15/177* (2006.01)
*G06F 13/00* (2006.01)

(52) U.S. Cl. ............. 713/300; 713/1; 713/330; 710/110
(58) Field of Classification Search ............ 713/320, 713/330, 1, 2; 711/4, 111, 114; 710/10, 710/14, 100, 110, 300
See application file for complete search history.

(56) References Cited

U.S. PATENT DOCUMENTS

| | | | | |
|---|---|---|---|---|
| 6,317,839 B1* | 11/2001 | Wells | | 713/320 |
| 6,657,534 B1* | 12/2003 | Beer et al. | | 340/3.1 |
| 6,851,068 B2* | 2/2005 | Jochiong et al. | | 713/330 |
| 7,546,478 B2* | 6/2009 | Kubo et al. | | 713/330 |
| 2003/0185308 A1* | 10/2003 | Schoenborn | | 375/257 |
| 2005/0149673 A1* | 7/2005 | Suzuki et al. | | 711/114 |
| 2008/0104431 A1* | 5/2008 | Shimada | | 713/300 |

* cited by examiner

*Primary Examiner* — Kim Huynh
*Assistant Examiner* — Brandon Kinsey
(74) *Attorney, Agent, or Firm* — Krishnendu Gupta; Jason A. Reyes

(57) ABSTRACT

A system for powering on downstream devices includes a master device; a first slave device; and a first communication link connecting the master device to the slave device for enabling the master device to transmit data signals to the slave device. The master device includes a power-on signal generator for injecting a power-on signal onto the communication link and the first slave device includes a power-on signal receiver for detecting the power-on signal injected on the communication link by the power-on signal generator and powering on the first slave device.

8 Claims, 2 Drawing Sheets

AUTOMATIC POWER-ON SYSTEM AND METHOD USING HIGH-SPEED COMMUNICATION LINE

FIELD OF THE INVENTION

The present invention is directed generally to a system and method for powering on components and, more particularly, to a system and method for automatically powering on downstream devices from a master device utilizing high-speed communication lines for transmitting a power-on signal.

BACKGROUND OF THE INVENTION

Data storage systems typically include at least one storage processor that controls data reads from and data writes to a plurality of disk drives. A number of disk drives are housed in a disk array enclosure, along with a controller for the disk drives and cache for facilitating the efficient transfer of data to and from the disk drives. Such a data storage system may be capable of accommodating a number of disk array enclosures. The disk array enclosures of such a data storage system are each separately connected to a power source and are always powered up when they are installed in the rack of the system, regardless of whether they need to be powered or not. In other words, even if the associated storage processor is powered off, the disk array enclosures will be powered. Furthermore, a disk array enclosure may be improperly installed in the rack in a way that enables power to be supplied to the enclosure, but with the data communication links improperly connected. In such a situation, there could be no indication of the improper installation until the problem manifests itself during use of the system.

SUMMARY OF THE INVENTION

The present invention is directed to a system and method for automatically powering on downstream devices from a master device utilizing high-speed communication lines for transmitting a power-on signal. When the master device is powered on, it generates the power-on signal, which is injected onto the high-speed communication line to the attached slave device. The slave device includes a power-on signal detection circuit that detects the power-on signal on the high-speed line and powers up the device. Therefore, the slave device only powers up when the master device is powered up, thus saving energy. Also, since the high-speed communication line must be properly connected for the slave device to receive the power-on signal, the powering on of the slave device is an indication that the high-speed communication line has been properly connected.

BRIEF DESCRIPTION OF THE DRAWINGS

These and other features of the invention will become more readily apparent from the following detailed description when read together with the accompanying drawings, in which.

DETAILED DESCRIPTION

Figure 1:
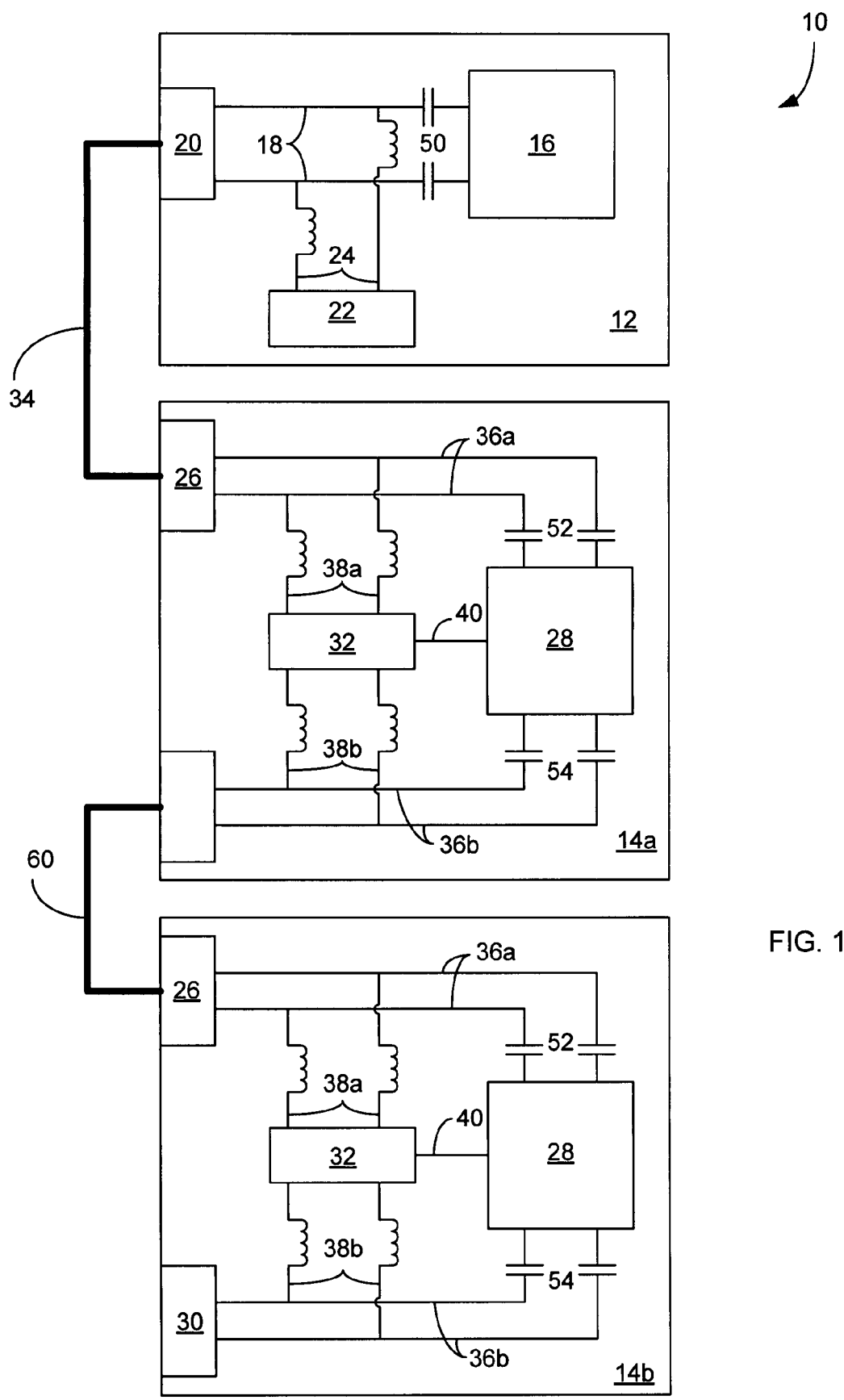
FIG. 1 is schematic block diagram of a system for automatically powering on downstream devices from a master device in accordance with the present invention.

FIG. 1 is a schematic block diagram of a system 10 for automatically powering on downstream devices from a master device using a high-speed communication link. As shown in FIG. 1, the master device is a storage processor 12. Slave devices connected to the storage processor 12 are disk array enclosures 14a and 14b.

Storage processor 12 includes a microprocessor 16 for transmitting data signals to, and receiving data signals over, differential signal high-speed communication lines 18, which are coupled to connector 20. Storage processor 12 further includes a power-on signal generation circuit 22 for generating a DC power-on signal when the storage processor 12 is powered on. Upon the storage processor being powered on, power-on signal generation circuit 22 generates and injects the power-on signal onto the high-speed communication lines 18 via lines 24. The power signal injected onto high-speed communication lines 18 inputs a DC bias onto the communication lines.

Each disk array enclosure 14 includes a connector 26, disk array 28, which may include disk drives, cache and a controller for controlling the transfer of data signals to and from the disk array, a connector 30 and a power-on signal detection circuit 32. Connector 26 is connected to connector 20 of storage processor 12 by high-speed link 34. In one embodiment of the invention, high-speed link 34 is a mini-SAS (Serially Attached SCSI) link, a bidirectional communication link which includes four transmission lines and four reception lines for transferring data signals between the connector 20 of storage processor 12 and connector 26 of disk array enclosure 14. Such a configuration enables the storage processor, in one embodiment, to transmit data signals at 3 Gb/s or more. It will be understood that any type of high-speed protocol may be used in the system 10 for transmitting high-speed data signals and the power-on signal to downstream devices.

In operation, when the storage processor 12 is powered on, power-on signal generation circuit 22 generates and injects the power-on signal onto the high-speed communication lines 18 via lines 24. Capacitors 50 block the DC signal from being received by the microprocessor 16. The DC power-on signal is transmitted from the connector 20 of storage processor 12 to the connector 26 of disk array enclosure 14 over the high-speed link 34. The power-on signal is transmitted to high-speed lines 36a and is detected by power-on signal detection circuit 32, which is coupled to high-speed lines 36a via lines 38a. Power-on signal detection circuit 32 is described in greater detail with reference to FIG. 2.

Power-on signal detection circuit 32 detects the DC power-on signal on high-speed lines 36a and, in response to this detection, activates the power supplies to the disk array 28 over line 40. Power-on signal detection circuit 32 passes the power-on signal from lines 36a through lines 38b to high speed lines 36b. Capacitors 54 block the DC power-on signal from the disk array 28, and the power-on signal is output to high speed communication link 60 through connector 30. Disk array enclosure 14b receives the power-on signal and operated in a similar manner as disk array enclosure 14a to power on its disk array 28.

The power-on signal generated by power-on signal generation circuit 22 remains on the high speed lines 18, 36a and 36b, as well as high speed links 34 and 60 while storage processor 12 is powered on. When storage processor 12 is transmitting data signals to, and receiving data signals from downstream devices 14a, 14b, the data signals on the high speed lines and links are transmitted on the lines with a DC bias equivalent to the DC voltage of the power-on signal. In one embodiment, this DC voltage is 3.3V. However, it will be understood that any suitable DC voltage may be used for the power-on signal, such as 5V and 1.2V.

Figure 2:
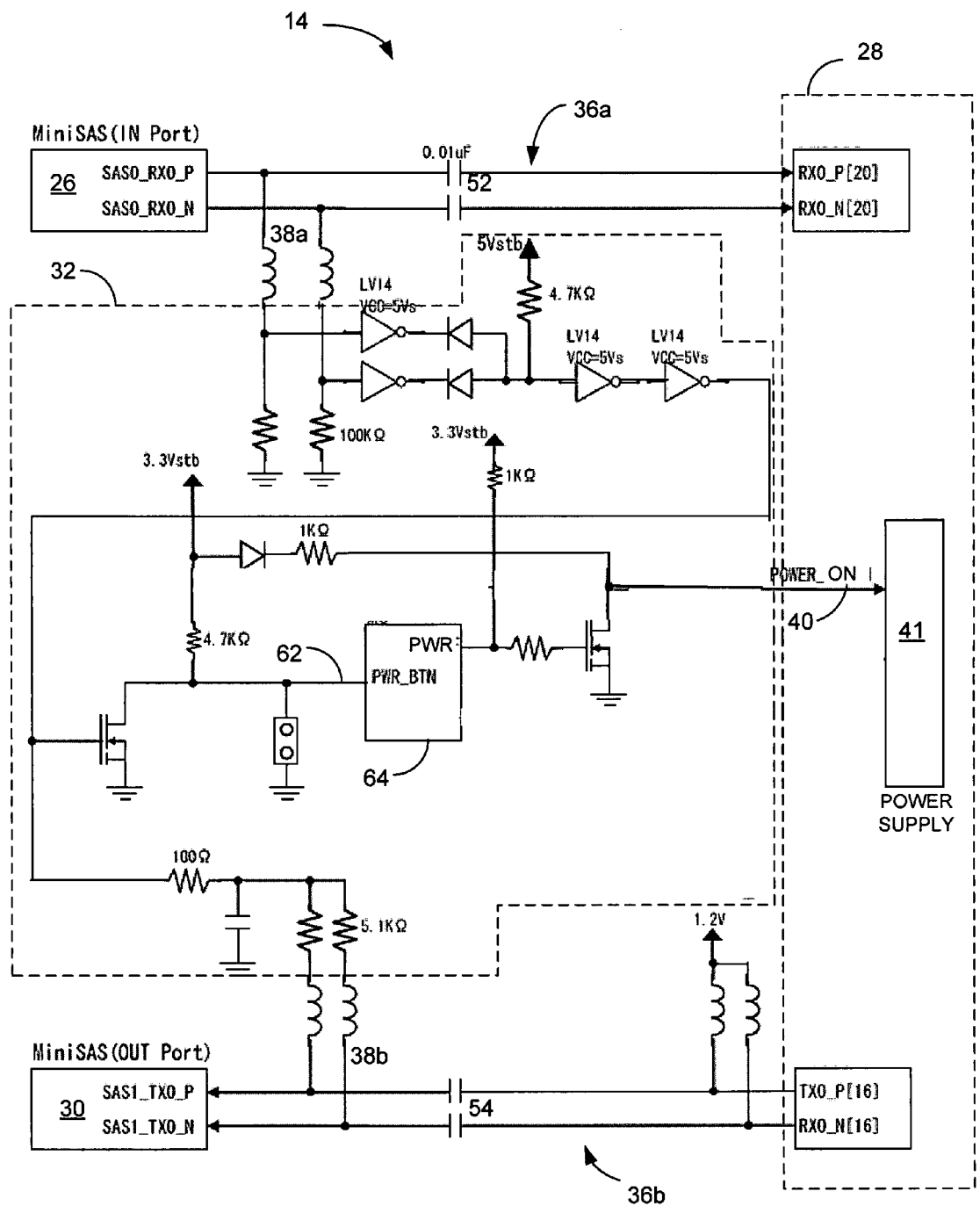
FIG. 2 is a schematic diagram of the power-on signal detection circuit in accordance with the present invention.

FIG. 2 is a schematic diagram showing one embodiment of the power-on signal detection circuit 32 of disk array enclosure 14. As shown, connector 26 receives the power-on signal and passes the power-on signal, along with any data signal received, to high-speed lines 36a. The data signal is transmitted to disk array 28, while the power-on signal is blocked from disk array 28 by capacitors 52. Only the power supply 41 and the input/output portion of the disk array 28 are shown in FIG. 2 for simplicity. It will be understood that disk array 28 includes many other components than shown, as described above. The power-on signal is detected by the power-on signal detection circuit 32 over lines 38a. The power-on signal triggers an input 62 of power switch 64, which then supplies a signal, via line 40, to the power supply 41 of disk array 28. The signal on line 40 turns on the power supply 41, which powers on disk array 28. The power-on signal passes through power-on signal detection circuit 32 to lines 38b, where it is passed to high speed lines 36b and to connector 30 for transmission over high-speed link 60 to the downstream disk array enclosure, if present in the system and coupled to the upstream disk array enclosure. Signals output by the disk array to lines 36b for transmission to downstream disk array enclosures are biased to the voltage of the power-on signal injected onto lines 36b via lines 38b. It will be understood that the values of components indicated in FIG. 2 are for example only.

Accordingly, the invention provides a system for automatically powering slave devices coupled to a master device by a high-speed link. By providing a DC bias power-on signal over the high-speed link, no additional links are required between the storage processor and the disk array enclosures. Since power will only be provided to a disk array enclosure when the high-speed link is properly connected between the storage processor and the disk array enclosures, an improper installation of the high-speed link will manifest itself by not enabling the disk array enclosure to power on. In order to remove power from the disk array enclosures, either the storage processor could be powered off, thus removing the power-on signal from power-on generation circuit 22 from the high speed lines 18, or the high speed communication link 34 may be disconnected to prevent the power-on signal from being transmitted from the power-on signal generation circuit 22 to the power-on signal detection circuit 32.

Additionally, binary signals other than a power-on signal may be transmitted to downstream devices in the manner described above. Signals such as "Ready" signals and "Wait" signals may be transmitted to downstream devices in the manner that the power-on signal is transmitted. In such a case, the master device uses the binary signal to instruct the downstream device to enter into a particular state. Each downstream device would include binary signal detection circuit similar to power-on detection circuit 32 that would detect the binary signal on the high-speed lines and would cause the downstream device to enter the state indicated by the binary signal. For example, when the binary signal is used as a wait signal, when the binary signal is injected on the high-speed lines, the downstream device detects the binary signal on its high-speed lines and its binary signal detection circuit causes the downstream device to enter a wait state. When the master device deasserts the wait signal, the binary detection circuit on the downstream device causes the device to exit the wait state. The particular detection circuitry required for processing the binary signal to cause the associated device to operate accordingly is known in the art and will not be described herein.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A system for powering on downstream devices comprising: a master device; a first slave device;
   a first communication link connecting the master device to the slave device for enabling the master device to transmit data signals to the slave device;
   the master device including a power-on signal generator for injecting a power-on signal onto the communication link, the power-on signal comprising a DC bias on the communication link, wherein the master device is capable of transmitting data signals and the power-on signal simultaneously on the communication link;
   the first slave device including a power-on signal receiver for extracting the power-on signal injected on the communication link by the power-on signal generator to power on the first slave device using a separate line from the communication link.

2. The system of claim 1 wherein the communication link comprises a high-speed communications link.

3. The system of claim 1 wherein the communication link comprises a SAS link.

4. The system of claim 1 further including a second slave device coupled to the first slave device by a second communication link, the first slave device passing the power-on signal received by the first slave device on the first communication link to the second slave device over the second communication link;
   the second slave device including a power-on signal receiver for detecting the power-on signal passed thereto on the second communication link by the first slave device and powering on the second slave device.

5. A system for providing a binary signal to downstream devices comprising:
   a master device; a first slave device;
   a first communication link connecting the master device to the slave device for enabling the master device to transmit data signals to the slave device;
   the master device including a binary signal generator for injecting a binary signal onto the communication link, the binary signal indicating a status instruction to the slave device, the binary signal comprising a DC bias on the communication link, wherein the master device is capable of transmitting data signals and the binary signal simultaneously on the communication link;
   the first slave device including a binary signal receiver for extracting the binary signal injected on the communication link by the binary signal generator to cause the first slave device to enter the status indicated in the binary signal using a separate line from the communication link.

6. The system of claim 5 wherein the communication link comprises a high-speed communications link.

7. The system of claim 5 wherein the communication link comprises a SAS link.

8. The system of claim 5 further including a second slave device coupled to the first slave device by a second communication link, the first slave device passing the binary signal received by the first slave device on the first communication link to the second slave device over the second communication link;
   the second slave device including a binary signal receiver for extracting the binary signal injected on the communication link by the first slave device to cause the second slave device to enter the status indicated in the binary signal using a separate line from the second communication link.

* * * * *